US012559354B2

(12) United States Patent
Pedersen et al.

(10) Patent No.: US 12,559,354 B2
(45) Date of Patent: Feb. 24, 2026

(54) CLAMP DEVICE AND A MOBILE LIFT SYSTEM WITH THE CLAMP DEVICE

(71) Applicant: Logitrans A/S, Ribe (DK)

(72) Inventors: Erling Pedersen, Ribe (DK); Mark Weber Vind, Ribe (DK); Søren Dam Ellegaard, Bække (DK)

(73) Assignee: Logitrans A/S, Ribe (DK)

( * ) Notice: Subject to any disclaimer, the term of this patent is extended or adjusted under 35 U.S.C. 154(b) by 242 days.

(21) Appl. No.: 18/265,750

(22) PCT Filed: Dec. 7, 2021

(86) PCT No.: PCT/DK2021/050354
§ 371 (c)(1),
(2) Date: Jun. 7, 2023

(87) PCT Pub. No.: WO2022/122101
PCT Pub. Date: Jun. 16, 2022

(65) Prior Publication Data

US 2024/0043254 A1 Feb. 8, 2024

(30) Foreign Application Priority Data

Dec. 8, 2020 (DK) ........................... PA 2020 70818

(51) Int. Cl.
*B66F 9/18* (2006.01)
*B66F 9/24* (2006.01)

(52) U.S. Cl.
CPC ................ *B66F 9/184* (2013.01); *B66F 9/24* (2013.01)

(58) Field of Classification Search
CPC .................................. B66F 9/24; B66F 9/184
(Continued)

(56) References Cited

U.S. PATENT DOCUMENTS 4,177,000 A 12/1979 Mccart et al.
4,714,399 A * 12/1987 Olson ..................... B66F 9/183 901/45
(Continued)

FOREIGN PATENT DOCUMENTS

CA 2828429 A1 4/2014
CN 1646409 A * 7/2005 ............... B66C 3/16
(Continued)

OTHER PUBLICATIONS

"Wang, Ruchao, The Design and Analysis of a Lightweight Robotic Arm Based on a Load-Adaptive Hoisting Mechanism", Dec. 2024, Actuators (Year: 2024).*
(Continued)

*Primary Examiner* — Terrell H Matthews
(74) *Attorney, Agent, or Firm* — Schmeiser, Olsen & Watts, LLP

(57) ABSTRACT

A clamp device for a mobile lift system and a mobile lift system is provided, where the clamp device has a supporting part and two gripper arms movably connected to the supporting part. An actuating system is arranged on the supporting part, where an actuator is connected to each of the gripper arms. The actuators functions as a main cylinder and a slave cylinder respectively. At least one accumulator is connected to the slave cylinder where the accumulator creates an opposing pressure as a result of the gripper arms' position.

11 Claims, 5 Drawing Sheets

(58) Field of Classification Search
USPC .......................................................... 414/620
See application file for complete search history.

(56) References Cited

U.S. PATENT DOCUMENTS

| | | | | |
|---|---|---|---|---|
| 4,742,468 | A * | 5/1988 | Ohashi | B66F 9/24 701/50 |
| 5,417,464 | A * | 5/1995 | Seaberg | B66F 9/184 414/730 |
| 5,516,174 | A | 5/1996 | Squyres | |
| 6,027,302 | A * | 2/2000 | Nilsson | B66F 9/184 294/907 |
| 6,843,636 | B2 * | 1/2005 | Jordan | B25J 13/082 414/21 |
| 10,900,825 | B2 * | 1/2021 | Petronek | B66F 9/22 |
| 2003/0017040 | A1 | 1/2003 | Jordan et al. | |
| 2005/0063811 | A1 * | 3/2005 | Seaberg | B66F 9/22 414/621 |
| 2006/0045708 | A1 * | 3/2006 | Bain | A61G 7/1017 414/620 |
| 2006/0073001 | A1 | 4/2006 | Chase | |
| 2007/0065271 | A1 | 3/2007 | Merin et al. | |
| 2017/0283228 | A1 | 10/2017 | Running | |
| 2020/0369502 | A1 | 11/2020 | Walthers | |

FOREIGN PATENT DOCUMENTS

| | | | | |
|---|---|---|---|---|
| CN | 102159491 | B * | 9/2015 | B66F 9/184 |
| CN | 108025440 | B * | 12/2021 | B66F 9/22 |
| DE | 3245715 | A1 * | 12/1982 | |
| EP | 1760033 | A2 * | 3/2007 | B66F 9/22 |
| EP | 3319762 | A1 * | 12/2016 | |
| GB | 2287989 | A | 10/1995 | |
| JP | S61 229795 | A | 10/1986 | |
| WO | WO-2011015442 | A1 * | 2/2011 | B66F 9/143 |

OTHER PUBLICATIONS

Wang "The Design and Analysis of a Lightweight Robotic Arm Based on a Load-Adaptive Hoisting Mechanism" (Year: 2024).*

International Search Report for PCT /DK2021/050354 mailed Feb. 4, 2022.

Written Opinion for PCT /DK2021/050354 mailed Feb. 4, 2022.

Automatic Clamp Force for Versatile Handling and Reduced Product Damage, Brochure [ online], Cascade Corporation, 2018, [hentet May 27, 2021], hentet fra<https :/ /www.cascorp.com/web 2/ downloads. nsfl'links/6904581 GB/%24FILE/6904581 HFC+%20Brochure GB.pdf.

* cited by examiner

CLAMP DEVICE AND A MOBILE LIFT SYSTEM WITH THE CLAMP DEVICE

CROSS-REFERENCE TO RELATED APPLICATIONS

This application claims priority to PCT Application No. PCT/DK2021/050354, having a filing date of Dec. 7, 2021, which is based DK Application No. PA 2020 70818, having a filing date of Dec. 8, 2020, the entire contents both of which are hereby incorporated by reference.

FIELD OF TECHNOLOGY

The following relates a lift system with a lifting unit, with a mounted clamp device. The clamp device encompasses two gripper arms movably connected to a supporting piece where the gripper arms can grab an item. An actuator is used to move the gripper arms and apply a clamping pressure upon the article.

BACKGROUND

Utilizing clamp devices to grab articles, such as tubes, where the gripper arms apply a continuous pressure upon the article is a known technique. The gripper arms can be manually activated by pumping oil into hydraulic cylinders connected to the gripper arms. A manometer on the lift system's control panel can provide readings on whenever an adequate clamping pressure is achieved to allow for the article to be lifted.

Small articles are prone to warping and thereby taking damage if the clamping pressure is too high. On the contrary, larger articles require a higher clamping pressure to ensure that these articles can be lifted.

With known lift systems it is not currently possible to adjust the clamping pressure in accordance with the size and dimensions of the various articles, meaning that the lift systems are set to apply a predetermined, constant clamping pressure.

US 2017/0283228 A1 discloses an alternative clamp device comprising two hydraulic cylinders, each connected to a telescopic gripping arm. The gripping arm can be extended in two stages, where an outer telescopic element is extended to a first maximum position after which an inner telescopic element is further extended to a second maximum position. This clamp device applies a stepped clamping pressure to the object, where the actual clamping force is difficult to control at the transition between the two pressure stages.

The HFC+ system from Cascade Corporation comprises two sets of clamping arms for gripping paper rolls, where the clamping force is automatically adjusted based on the measured weight of the object. The clamping force is automatically switched between a lower clamping force and a higher clamping force using a pressure switch.

SUMMARY

An aspect relates to a clamp device and a lift system which overcomes the problems present among the known technology.

Another purpose of embodiments of the present invention is to provide a clamp device and a lift system which allows for a safe and careful way to grab different articles.

A further purpose of embodiments of the present invention is to provide a clamp device and lift system which minimizes the risk of damaging smaller articles.

Embodiments of the present invention differentiates itself from the known technology by providing a clamp device for a mobile lift system, encompassing:

- a supporting part with an interface configured to be connected to a corresponding interface on a lift unit in the lift system,
- a gripper arm arranged in each end of the supporting part where the one end of the gripper arm is movable, in particular rotatable, connected to the supporting part and the other end is configured to grab an article,
- an actuating system arranged on the supporting part and connected to at least one of the gripper arms where the actuating system comprises at least one actuator configured to move the at least one gripper arm between an open position and at least one clamping position, particularly to rotate the at least one gripper arm in an axis of rotation around the supporting part,
- where the actuating system is configured to grab the article with a clamping pressure and to adjust the clamping pressure based on the gripper arms' position, wherein the clamping pressure is gradually adjusted between the open position and the at least one clamping position.

An improved clamp device is hereby provided, which minimises the risk of damaging articles during lifts and allows for varying clamping pressure in accordance with the various article's sizes and dimensions. The clamp device is particularly suited for the handling of coils but is also useful for other articles such as barrels, pipes, boxes, crates, canisters, etc. In contrast to other known clamp devices a safe and careful handling of articles is hereby achieved through an automatic adjustment of the clamping pressure in accordance with the article's size and/or dimensions.

The clamp device comprises a supporting part with an interface accommodated to be installed either directly or indirectly onto a lift unit as part of a lift system. The lift unit comprises a corresponding interface adapted for the installation of the clamp device and/or a rotation unit. The interface on the clamp device and/or on the lift unit can comprise one or more couplings, so that the clamp device can be connected to an internal energy source and/or a control unit on the lift system. The couplings can comprise hydraulic or pneumatic coupling elements, power cables, and/or similar coupling elements. The clamp device can hereby be installed on any lift system, particularly a mobile lift system. The clamp device can thus be controlled via the control unit and/or be driven by an energy source on the lift system.

The clamp device comprises two additional gripper arms arranged at each end of the supporting part, where the one end of each gripper arm is connected to the supporting part in a flexible manner. The gripper arms can be movably connected to the supporting part, or be rotationally connected to the supporting part, whereby the gripper arms can be moved/rotated in a gripping direction. Optionally, the clamp device can comprise a manually operated adjustment mechanism configured to adjust the gripper arms' shared distance in the gripping direction. Alternatively, the adjustment mechanism can be driven by an energy source integrated into the clamp device or into the lift system.

The gripper arms can be fitted with one or more supporting plates, with possible layers of rubber or another deformable layer applied to them in order to increase the supporting plate's friction and thereby gently grab the articles. The supporting plates can be connected in a tiltable manner to the available end of the gripper arms. Hereby, the clamp device can be positioned in relation to an article so that the gripper arms can reach around the article and hold on to it.

The clamp device also comprises an actuator system configured to move the gripper arms in the gripping direction. At least one actuator is arranged on to the supporting part and connected to at least one gripper arm, where the actuator is powered by an integrated energy source or through a manually operated drivable unit. The drivable unit or the energy source can be integrated into the clamp device or onto the lift system. In an embodiment, each gripper arm is connected to its own actuator, where the actuators can be controlled individually or in sync. Thus, the gripper arms can be moved into any clamping positions between an open position and a closed position with the help of the actuator.

The clamping pressure is gradually adjusted from the open position to the closed position, or vice versa. Thus, the clamping pressure is continuously adjusted during movement of the gripper arm instead of performing a stepwise adjustment as in the conventional art clamp devices. This provides a better control of the clamping pressure as there is no transition between two pressure stages.

According to an embodiment, the actuator system is configured to apply a substantially constant pressure in a gripping direction to create an opposing pressure as a function of the gripper arms' position, where the constant pressure and the opposing pressure combined create a resulting clamping pressure.

The present clamp device can generate an initial pressure in the grip direction with the help of the actuator once this is activated. This initial pressure can be independent of the gripper arm's position whereby the initial pressure can be utilized as a pressure frame of reference. The initial pressure can be a relatively constant pressure, or alternatively be adjusted via the lift system's control unit. Furthermore, the clamp device can generate an opposing second pressure in the gripping direction where the second pressure will negate part of the initial pressure. The second pressure can depend on the gripper arm's positioning, whereby the pressure will vary in accordance with the gripper arm's position. The second pressure can be lower than the initial pressure, with the two pressures combined resulting in a pressure inflicted upon the article.

In this way, a simple method of adjusting the clamping pressure in accordance with the article's size and/or dimensions is achieved. This is desirable in the handling of relatively small articles as these are prone to deformation at a too high clamping pressure.

Alternatively, other techniques can be applied to adjust the clamping pressure. For example, a user is able to adjust the clamping pressure through a user terminal, e.g., a computer terminal or a screen on the control unit. This can, as an example, be achieved by the user manually selecting or entering the type of article and/or its dimensions in a menu whereafter the control unit automatically determines a clamping pressure based on these inputs and then activates the actuator(s). Alternatively, the user can manually enter or adjust the maximum or minimum clamping pressure through the user terminal.

According to an embodiment the actuator system comprises a main cylinder connected to a slave cylinder so that a first medium flows between the main cylinder and the slave cylinder.

At least two containers or cylinders arranged upon the supporting part can in an embodiment function as actuators where the two containers/cylinders are interconnected so that a first medium can circulate between the two containers. In an embodiment, the one container will function as a main cylinder while the second container will function as a slave cylinder. The main cylinder is connected to the one gripper arm while the slave cylinder is connected to the second gripper arm. Hereby ensuring that the two cylinders follow along each other.

The containers/cylinders can in this embodiment be connected to a pump unit that is either controlled manually or controlled electronically by the controller within the lift system. The first medium can then be manually or automatically led in and out of the main cylinder when the gripper arms are activated.

According to an embodiment, the actuator system comprises at least one accumulator connected to at least one of the main and slave cylinders, where the at least one accumulator is configured to generate an opposing pressure through the compression of another medium.

The actuator system further comprises one or more accumulators arranged on the supporting part. At least one accumulator is connected to at least one gripper arm with each gripper arm being connected to its own individual accumulator. The accumulator contains a second medium which can be compressed, thereby creating the opposing pressure. The accumulator can be connected to the gripper arm so that the second medium is compressed as the gripper arm is moved/rotated towards the clamping position. Alternatively, the accumulator can be connected to the gripper arm so that a negative pressure is created as the gripper arm is moved/rotated towards the clamping position. This counter pressure/negative pressure will counteract the pressure generated by the actuators/cylinders.

In a particular embodiment the accumulators are connected to the main cylinder or the slave cylinder so that the first medium can be transferred into the accumulator when the gripper arm is moved towards the gripping position. Hereby the second medium is compressed, and the pressure is increased in the second medium and partially also in the first medium. When the gripper arm is moved towards the open position the first medium will be transferred out of the accumulator. Thus, the pressure will decrease in the second medium and partially also in the first medium.

The number of accumulators and the majority of these can be adjusted to fit a particular use, making it possible to achieve varying pressure curves.

According to an embodiment, at least one of the first and second mediums is a hydraulic fluid or type of gas.

The main cylinder and slave cylinder can be hydraulic or pneumatic containers wherein a hydraulic fluid or type of gas can circulate. Each cylinder can comprise a piston rod which can be connected to the respective gripper arm. The piston head can divide the container into two chambers, the first chamber and the second chamber. The second chamber in the main cylinder can be connected with the first chamber in the slave cylinder, where the first medium can circulate between the two chambers.

The second chamber in the slave cylinder can be connected to a chamber in the accumulator(s), where the first medium can circulate between the two chambers. Alternatively, a third medium can circulate between the two chambers.

The first chamber in the main cylinder can be connected to a hydraulic/pneumatic pump where the first medium can circulate between the chamber the pump. Alternatively, a fourth medium can circulate between the chamber and the pump.

The third and/or fourth medium can be different from the first and/or second medium. This also makes it possible to achieve different pressure curves.

According to an embodiment, at least one position sensor is arranged relative to the at least one gripper arm and registers the gripper arms' position, wherein the output of the at least one position sensor is electrically inputted to a control unit, which adjusts the clamping pressure as function of the gripper arms' position.

The clamping pressure can also be adjusted by registration of the angular/axial position of the gripper arm. One or more position sensors can be arranged on the supporting part relative to the gripper arms. The position sensor can register the angular or axial movement of the gripper arm and convert it to an electrical signal suitable for processing in the control unit. The position sensor can be an angular position sensor, a linear position sensor, a magnetic sensor, an encoder, or another type of position sensor. This allows the control unit to track the position of the gripper arm during operation.

The electrical signal can be inputted to the control unit, which controls the operation of the actuator system. The control unit can determine a clamping pressure control signal based on the inputted signal, wherein the control unit adjusts the current clamping pressure in accordance with the clamping pressure control signal by activation of the actuators. The control unit may use a predetermined algorithm or look-up table to determine the clamping pressure control signal.

Alternatively or additionally, one or more pressure sensors may be arranged relative to the actuator system and may register the actual clamping pressure. The position sensor can convert it to an electrical signal suitable for processing in the control unit. The control unit can control the activation of the actuators based on the measured clamping pressure. This allows the control unit to monitor the applied clamping pressure during operation. The control unit may also monitor the pressure within the actuator system, e.g., the clamping pressure, to ensure that it remains within safety limits during operation.

According to an embodiment, the clamping pressure is at its highest when the gripper arms are in an outer clamping position and the clamping pressure is at its lowest when the gripper arms are in an inner clamping position.

The clamp device can with benefit be designed in such a way that the clamping pressure is highest when the gripper arms are in a maximal/outer clamping position, equal to the open position. Likewise, the clamp device can be designed in such a way that the clamping pressure is lowest when the gripper arms are in a minimum/inner clamping position, equal to the closed position. Thus, it is possible to gentle grab on to small articles as well as big articles, given that big articles typically require a higher clamping pressure than small articles.

In an embodiment, the clamping pressure may continuously decrease as the gripper arm moves, or rotates, towards the closed position. Similarly, the clamping pressure may continuously increase as the gripper arm moves, or rotates, towards the open position. The current clamping pressure may be monitored via the user interface. The clamping pressure may be determined using a linear or non-linear function implemented in the controller.

Embodiments of the present invention differentiates itself from the conventional art by providing a mobile lift system, encompassing:

- a base,
- a lift unit arranged on the base, where the control unit is configured to either raise or lower a clamp device in a lift direction,
- a drive unit connected to the lift unit where the drive unit is configured to drive the lift unit possibly with the help of an internal energy source,
- a control unit connected to the lift unit where the control unit is configured to control at least the lift unit, where the clamp device is configured as stated above.

Hereby a lift system with a clamp device is achieved, which minimizes the risk of damaging small articles, and which can adjust the clamping pressure in accordance with the dimensions and/or size of various articles. This increases the flexibility of the lift system while simultaneously achieves a careful way of lifting the articles. The clamping pressure can thereby be adjusted in accordance with the gripper arms' positioning. This is achieved by gradually adjusting the clamping pressure as the gripper arms moved from the open position towards the closed position, or vice versa. Thereby, allowing for an improved clamping pressure control as no transition between two pressure stages exists.

The lift system comprises a base with wheels, tracks or similar, whereby the lift system can be moved around a floor or similar. The base if configured to support the lift unity, the control unit and the energy source. The lift system can comprise an engine of choice connected to the wheels/tracks, which can be controlled via the control unit. The lift system can thereby be moved around manually or with the help of the built-in engine.

The lift system further comprises a lift unit arranged on the base where the lift unit is configured to raise or lower the clamp device in a lift direction. The lift device can comprise an interface movably arranged in a lifting frame where a rotation unit and/or a clamp device can be installed on the interface. The lift unit is driven by a drive unit on the lift system. The lift unit can comprise an engine, e.g., an electronic engine, connected to the interface via a chain, where the engine is powered by the drive unit. The lift unit can comprise an optional lock mechanism so that the clamp device can be locked into at least one height position. This makes it possible to either manually or automatically raise/lower the clamp device.

The drive unit within the lift system can comprise an integrated energy source, such as a battery, battery pack, or fuel cell, which can be used to power the various electrical components in the lift system. The energy source can also be connected to the clamp device and/or the rotation unit via the interface, whereby the clamp device and/or rotation unit can be powered by the energy source. The drive unit can likewise be manually operated, with the user manually driving the lift unit, clamp device and/or rotation device for example using an integrated pump solution. Alternatively, the pump device can be electronically controlled vie a control unit on the lift system.

The control unit on the lift system comprises a handle and at least one control panel connected to a controller integrated into the lift system. The control panel can comprise one or more user interfaces wherefrom the user can control the lift unit, the rotation unit and/or the clamp device. The control unit can comprise an optional remote control, either wired or wireless, connected to the controller which can also be used by the user to control the lift unit, the rotation unit and/or the clamp unit. The control unit makes it possible for the user to easily and securely operate the lift system, e.g., by controlling the speed, lock positions, etc., on the lift unit, rotation unit and/or clamp device.

According to one embodiment, a rotational unit is arranged between the clamp device and the lift unit, with the rotation unit being configured to rotate the clamp device in a rotational direction around a turn axis.

A rotational unit can be arranged between the clamp device and the lift unit which facilitates that the clamp device and thus the article can be turned around, i.e., rotated around a rotational axis. The rotation unit can comprise a rotatable mechanism that can either be operated manually or via an engine, e.g., an electrically driven engine. The rotation unit can comprise an optional lock mechanism so that the clamp device can be locked in at least one given radial position. The clamp device can hereby be rotated and possibly locked into a given turn position so that the user can access the article in an ergonomically correct work posture. As a result, the clamp device can be rotated and possibly locked in a given turn position so that the article can be transferred to another system, e.g., a transportable lifter for easy placement of the article.

According to one embodiment at least one sensor is arranged on the lift system and configured to directly or indirectly measure at least the clamping pressure, where the at least one sensor is connected to the control unit.

Beneficially, the lift system can comprise one or more sensors for the purpose of registering different parameters throughout the lifting process. For example, a first sensor can be arranged in the clamp device and be configured to directly or indirectly measure the clamping pressure. The first sensor can be a pressure sensor or force sensor. The first sensor can be connected to the control unit, e.g., the controller, where the registered force/pressure can be read off a screen. Alternatively, the control unit can comprise a lamp which indicates whether or not. it is safe to lift the article.

The lift system can also comprise a second sensor configured to measure whether the clamp device is under strain. The other sensor can be a load cell or a strain gauge. Thus, it is possible to register whether it is safe to open the clamp device.

The clamp device may also be fitted with one or more position sensors, as mentioned above.

BRIEF DESCRIPTION

Some of the embodiments will be described in detail, with references to the following Figures, wherein like designations denote like members, wherein.

REFERENCES

| | |
|---|---|
| Lift system | 1 |
| Base | 2 |
| Lift unit | 3 |
| Control unit | 4 |
| Drive unit | 5 |
| Clamp device | 6 |
| Lift direction | 7 |
| Rotational unit | 8 |
| Rotational direction | 9 |
| Central axis, axis of rotation | 10 |
| Supporting part | 11 |
| Gripper arms | 12 |
| Grip direction | 13 |
| Actuator system | 14 |
| Initial pressure, constant pressure | 15 |
| Secondary pressure, opposing pressure | 16 |
| Clamping pressure, resulting clamping pressure | 17 |
| Article | 18 |
| Supporting plate | 19 |
| Clamp device interface | 20 |
| Lift unit interface | 21 |
| Axis of rotation | 22 |
| First actuator, cylinder | 23 |
| Second actuator, cylinder | 24 |
| First accumulator | 25 |
| Second accumulator | 26 |
| The piston | 27 |
| First chamber | 28 |
| Second chamber | 29 |
| First medium | 30 |
| Second medium | 31 |
| Accumulator | 32 |
| Third medium | 33 |
| Fourth medium | 34 |

DETAILED DESCRIPTION

Figure 1:
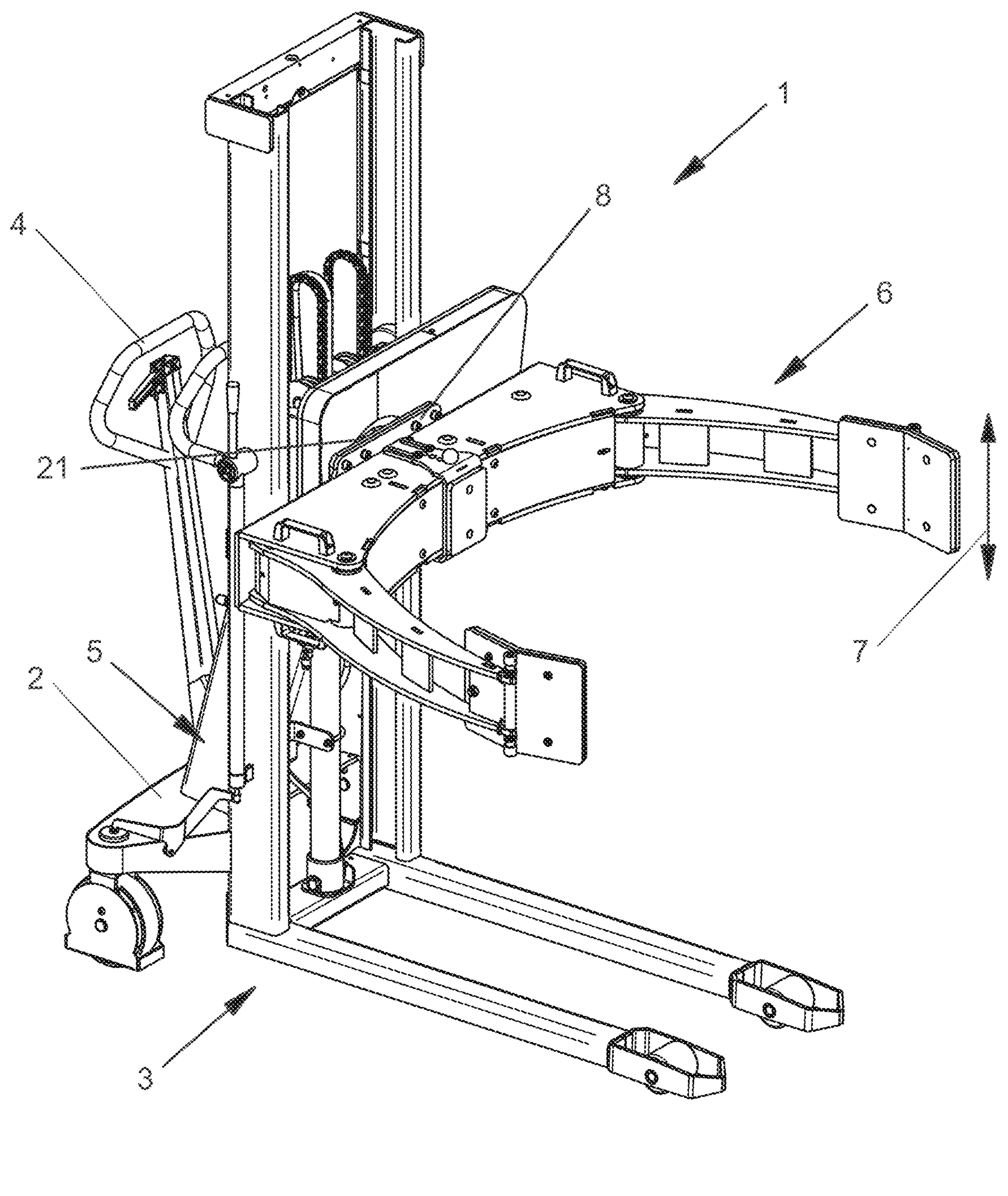
FIG. 1 shows a draft of an exemplary lift system according to embodiments of the invention.

FIG. 1 shows a draft of an exemplary lift system 1 according to embodiments of the invention, encompassing a base 2 with wheels, a lift unit 3 arranged at the base, a control unit 4 connected to the lift unit 1, and a drive unit 5 connected to the lift unit 3.

The lift unit 3 is configured to raise or lower a clamp device 6 in a lift direction 7. The drive unit 5 is configured to drive the lift unit 3 through an internal energy source, e.g., a battery.

The control unit 4 is configured to control at least the lift unit 3. Here, the control unit 4 is also configured to control the clamp device 6. The control unit 4 in this case comprises a handle and at least one control panel.

A rotational unit 8 is arranged between the clamp device 6 and the lift unit 3. The rotational unit 8 is attached to interfaces (not shown) on the lift unit 3 and clamp device 6 respectively.

Figure 2:
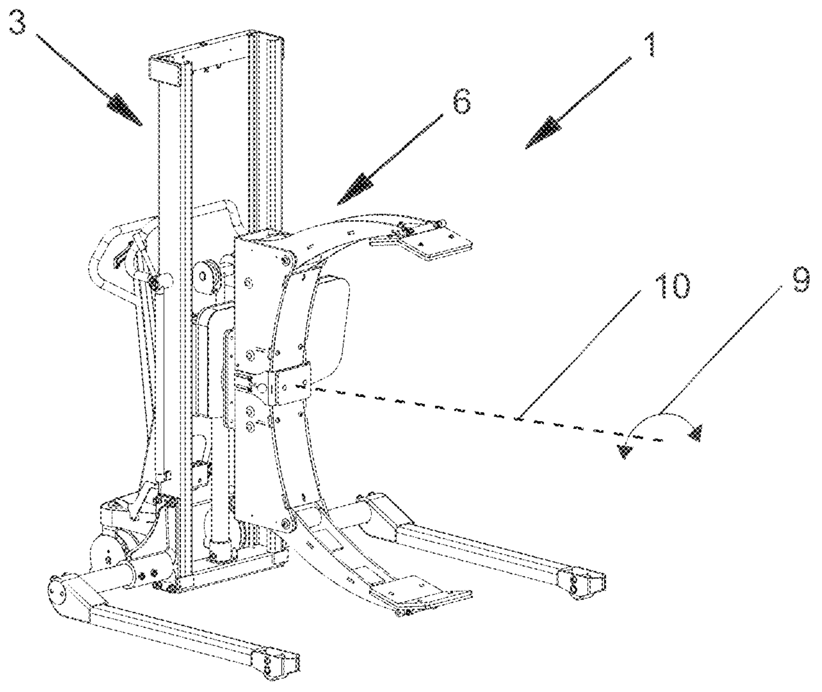
FIG. 2 shows the lift system shown in FIG. 1 with the clamp device locked in a vertical position.

FIG. 2 shows the lift system 1 with the clamp device 6 locked in a vertical position where the lift unit 3 is raised and locked in a flip position. The rotational unit 8 is configured to rotate the clamp device 6 in a rotational direction 9 around an axis of rotation 10. Here, the axis of rotation 10 is a central axis on the clamp device 6.

The rotational unit 8 can comprise a handle to manually flip the clamp device 6, alternatively the rotational unit 8 can comprise an actuator e.g., an electric actuator to automatically flip the clamp device 6.

Figure 3:
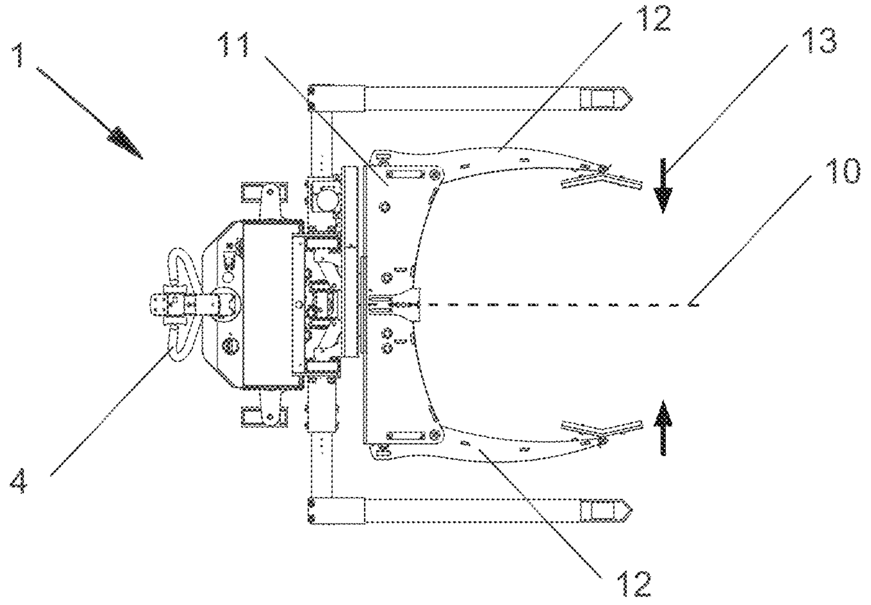
FIG. 3 shows the lift system shown in FIG. 1 as seen from the top with the gripper arm in an open position.

FIG. 3 shows the lift system 1 shown from the top with the clamp device 6 in an open position. The clamp device 6 comprises a supporting part 11 and two gripper arms 12 rotatably connected to the supporting part 11. The gripper arms 12 can be rotated in grip direction 13 around an axis of rotation (see FIG. 5).

Figure 4:
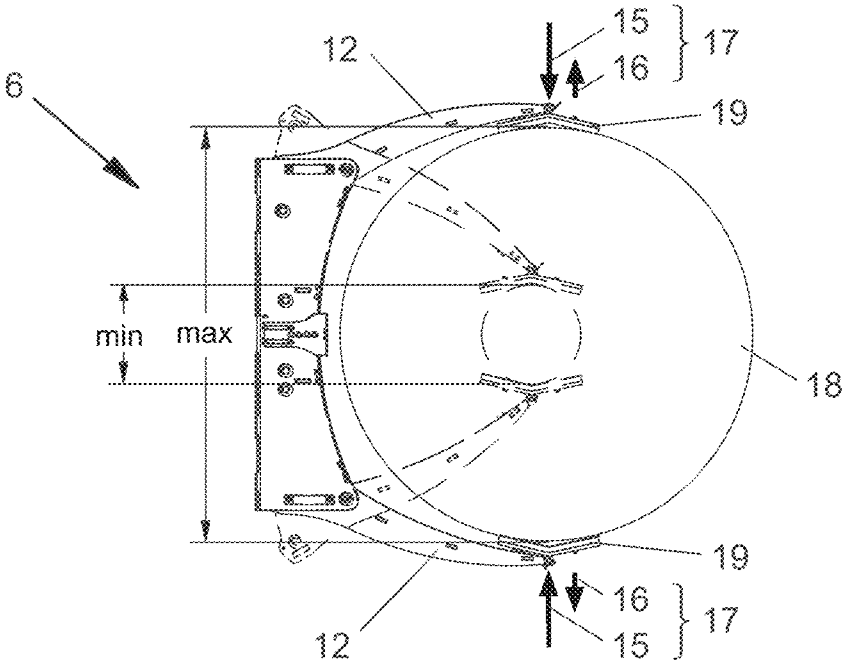
FIG. 4 shows the clamp device with the gripper arms in an outer clamping position and in an inner clamping position.

The gripper arms 12 can be rotated between an open position (see FIG. 1) and at least one clamping position (see FIG. 4). The gripper arms 12 can be rotated with the help of an actuator arranged in the clamp device 6.

FIG. 4 shows the clamp device 6 with the gripper arms 12 in an outer clamping position (indicated as "max") and an inner clamping position (indicated as "min").

The clamp device 6 comprises an actuator system (see FIG. 5) configured to inflict an initial pressure 15 e.g., a constant pressure in the grip direction 13. The actuator system further configured to create a second pressure 16 e.g., an opposing pressure in the grip direction 13 as a function of the gripper arm's 12 position. The first and second pressure 15, 16 combined create a resulting clamping pressure 17 upon the article 18.

Hereby the clamping pressure 17 placed upon the article 18 as a function of the gripper arms' 12 positioning is adjusted. The clamping pressure 17 is highest when the gripper arms 12 are in an outer clamping position (max) and the clamping pressure 17 is lowest when the gripper arms 12 are in an inner clamping position (min).

A supporting plate 19 is arranged in the opposite end of the gripper arm 12 where the supporting plate is adjusted to press up against the article 18. The supporting plate 19 has a particular length and width and is connected to the gripper arm 12 that allows for tilting so that it can accommodate the article 18.

Figure 5:
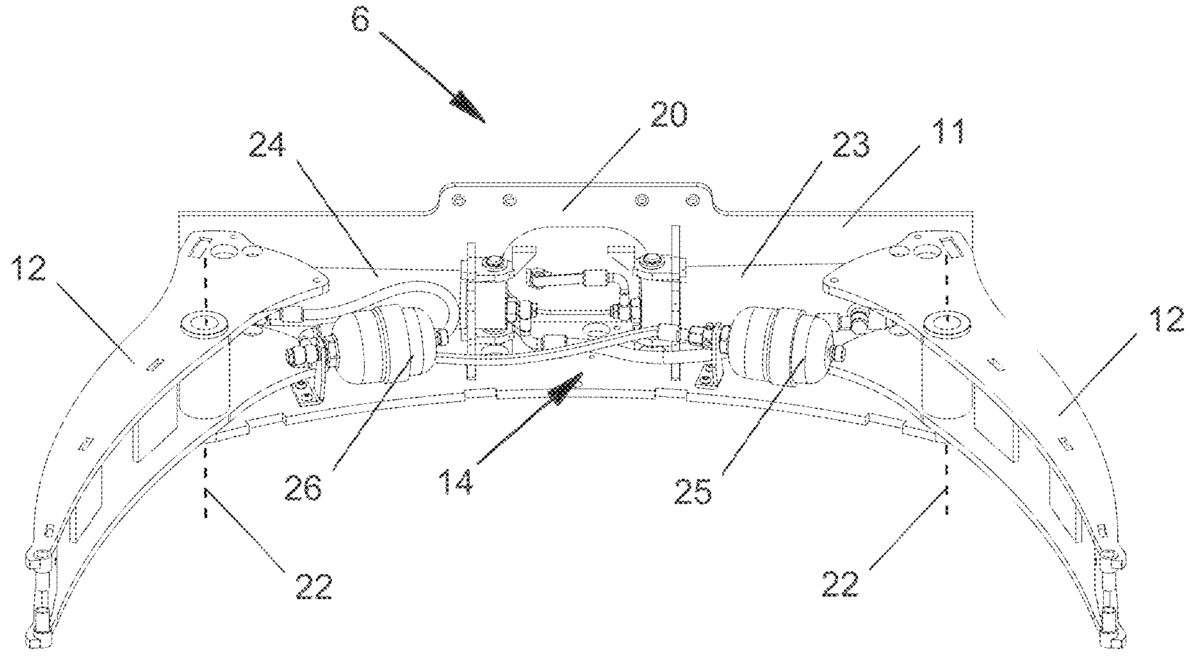
FIG. 5 shows an exemplary embodiment of the clamp device.

FIG. 5 shows an exemplary embodiment of the clamp device 6 where the front plate and top plate and supporting plates 19 have been removed for illustrative purposes. The supporting part 11 has an interface 20 adjusted for installation to a corresponding interface 21 on the lift unit 3. The supporting part 11 is designed to provide support for the gripper arms 12 and house the actuator system 14.

The gripper arms 12 connected to the supporting part 11 in a way that allows for rotation, so that they can rotate in the grip direction 13 around the axis of rotation 22. A first actuator 23 is connected to the one gripper arm 12 and a second actuator 24 is connected to the second gripper arm 12. The actuator 23, 24 is configured to move, e.g., rotate, the gripper arms 12 in the grip direction 13 between an open position and at least one clamping position. The actuators 23, 24 are hydraulic cylinders and generate an initial pressure 15 in the grip direction as indicated in FIG. 4. One of the cylinders 23, 24 functions as a main cylinder while the other cylinder 23, 24 functions as a slave cylinder.

A first accumulator 25 and a second accumulator 26 are further connected to one of the cylinders 23, 24, e.g., the slave cylinder. The accumulators 25, 26 are hydraulic accumulators and generate a second pressure 16 opposite of the grip direction 13 as shown in FIG. 4.

In this configuration the clamping pressure 17 is adjusted as the actuators 23, 24 rotate the gripper arms 12 in a grip direction 13 while simultaneously creating an opposing pressure in the accumulators 25, 26.

Figure 6:
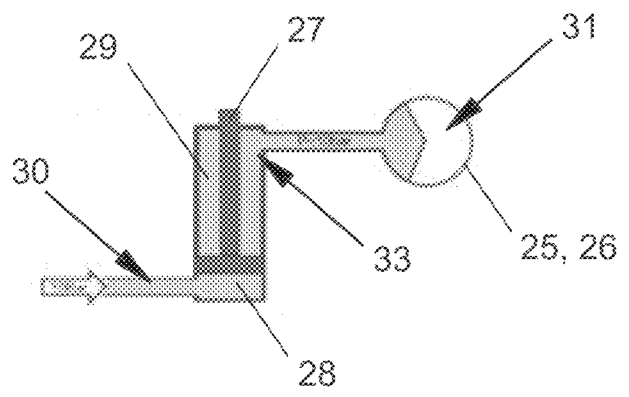
FIG. 6 shows the piston's position within the slave cylinder shown in FIG. 5 in the outer clamping position.
Figure 7:
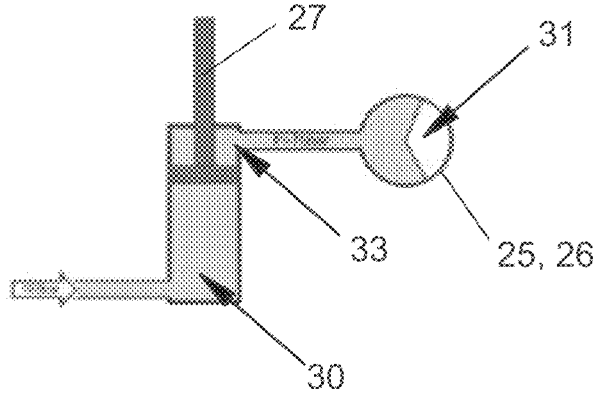
FIG. 7 shows the piston's position within the slave cylinder shown in FIG. 5 in the inner clamping position.

FIG. 6 shows the piston's 27 position within the slave cylinder in the outer clamping position while FIG. 7 shows the piston's 27 position within the slave cylinder in the outer clamping position. Here the second cylinder 24 functions as a slave cylinder.

The cylinders 23, 24 have an inner chamber divided into a first chamber 28 and a second chamber 29, wherein the two chambers are separated by the piston's 27 head. A first medium 30 is transported from the main cylinder and into the first chamber 28 in the slave cylinder. A third medium 33 is transported from the second chamber 29 within the slave cylinder and into an accumulator 32 containing a second medium 31.

In the outer clamping position, the compression of the second medium 31 within the accumulator 25, 26 will be minimal. This leads to the resulting pressure 17 which is inflicted by the piston 27 upon the article 18 through the gripper arm 12 will be highest, given that the pressure in the first medium 30 from the main cylinder will be constant.

In the inner clamping position, the compression of the second medium 31 within the accumulator 25, 26 will be maximal. This leads to the resulting pressure 17 which is inflicted by the piston 27 upon the article 18 via the gripper arm 12 will be at its lowest, given that the first medium 30 from the main cylinder will be constant.

Here the first medium 30 and/or third medium 33 is a hydraulic fluid while the second medium 31 is a type of gas.

Figure 8:
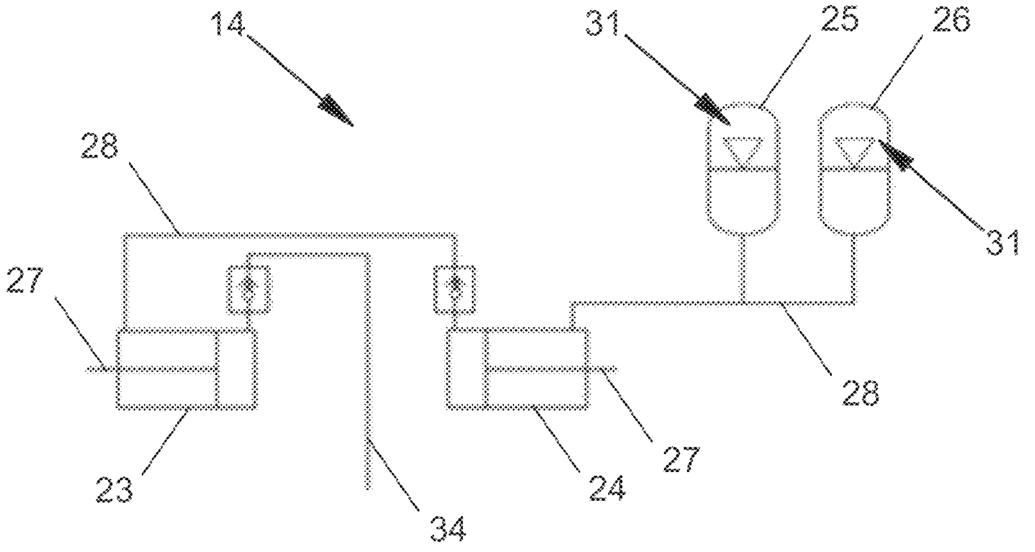
FIG. 8 shows an exemplary configuration of the actuator system.

FIG. 8 shows an exemplary circuitry diagram concerning the actuator system 14 shown in FIG. 5. There the first accumulator 25 is similar to the second accumulator 26. Alternatively, they can have two different configurations/sizes. Here the two accumulators 25, 26 are connected to a series of slave cylinders.

A fourth medium 34 is led into the first chamber 28 within the main cylinder from a hydraulic unit, e.g., a pump, when the gripper arms 12 are rotated towards the article 18. The hydraulic unit can be installed upon the lift system 1.

The piston 27 within the main cylinder is pushed out of the main cylinder and the first medium 30 is transferred over to the slave cylinder. Hereby the piston 27 within the slave cylinder is pushed out of the slave cylinder and the third medium 33 is transferred to the accumulators 25, 26. This leads to the second medium 31 being compressed and creating an opposing pressure. When the gripper arms 12 are rotated away from the article 18 the pistons 27 will then push back the cylinders and the opposing pressure will decrease.

At least one sensor arranged on the lift system 1 and configured to either directly or indirectly measure at least the clamping pressure 17, where the at least one sensor is connected to the control unit 4.

Figure 9:
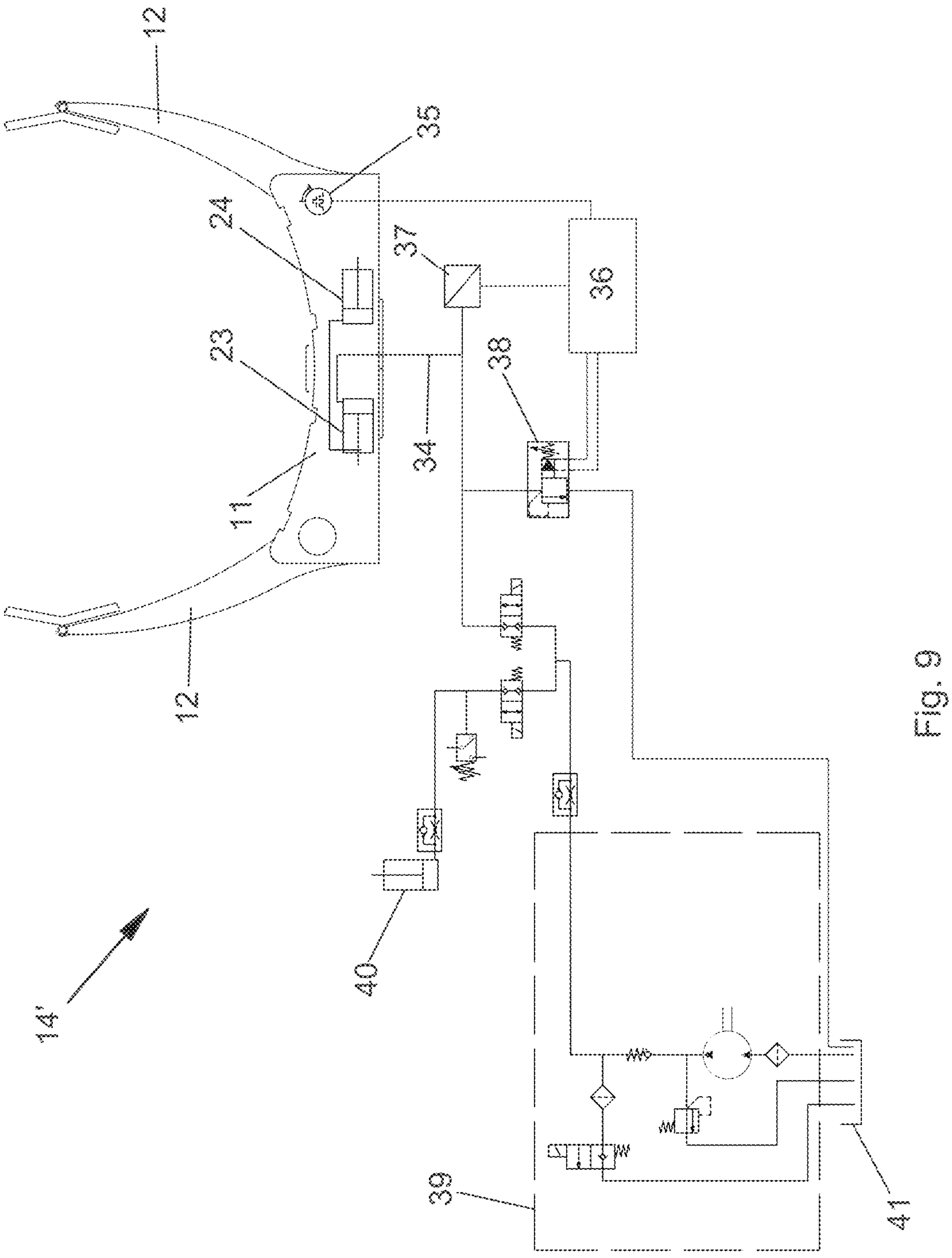
FIG. 9 shows an alternative configuration of the actuator system.

FIG. 9 shows an alternative circuitry diagram concerning the actuator system 14' for operating the gripper arms 12. Here, a position sensor 35 is arranged on the supporting part 11 of the clamp device 6. The position sensor 35 is electrically connected to the controller 36 in the control unit 4, wherein the position sensor 35 registers the position of the gripper arm 12.

Further, a pressure sensor 37 is electrically connected to the controller 36, wherein the pressure sensor 37 registers a local pressure within the actuator system. Here, the pressure of the fourth medium 34 is registered and inputted to the controller 36.

The controller 36 is also electrically connected to at least one pressure limiting valve 38, which is controlled by the controller 36 to ensure that the pressure supplied by the hydraulic system 39 remains within safe operating limits.

Hydraulic fluid is pumped via the pump to the actuators 23, 24 in the clamp device and further to the lift actuator 40. Any bypassed hydraulic fluid from the pressure limiting valves 38 is returned to the supply tank 41.

Although the present invention has been disclosed in the form of embodiments and variations thereon, it will be understood that numerous additional modifications and variations could be made thereto without departing from the scope of the invention.

For the sake of clarity, it is to be understood that the use of “a” or “an” throughout this application does not exclude a plurality, and “comprising” does not exclude other steps or elements. The mention of a “unit” or a “module” does not preclude the use of more than one unit or module.

The invention claimed is:

1. A clamp device for a mobile lift system comprising:

a supporting part with an interface configured to be connected to a corresponding interface on a lift unit in the lift system;

a gripper arm arranged in each end of the supporting part, where the one end of the gripper arm is movable connected to the supporting part and the second end is configured to grab an article;

an actuating system arranged on the supporting part and connected to at least one of the gripper arms, where the actuating system comprises at least one actuator configured to move the at least one gripper arm between an open position and at least one clamping position;

wherein the actuator system is configured to grab an article with a clamping pressure and to adjust the clamping pressure based on a position of the gripper arm, wherein the clamping pressure is gradually adjusted between the open position and the at least one clamping position, and wherein the actuating system is configured to apply a substantially constant pressure in a grip direction and to create an opposing pressure which combined create a resulting clamping pressure.

2. The clamp device according to claim 1, wherein the actuating system comprises a main cylinder and slave cylinder so that a first medium flow between the main cylinder and the slave cylinder.

3. The clamp device according to claim 2, wherein the actuating system comprises at least one accumulator connected to at least one of the main and slave cylinders, where the at least one accumulator is configured to generate the opposing pressure by compression of a second medium.

4. The clamp device according to claim 2, wherein at least one of the first and second mediums is a hydraulic fluid or a type of gas.

5. The clamp device according to claim 1, wherein at least one position sensor is arranged relative to the at least one gripper arm and registers the position of the gripper arm, wherein the output of the at least one position sensor is electrically inputted to a control unit, which adjusts the clamping pressure based on the position of the gripper arm.

6. The clamp device according to claim 1, wherein the clamping pressure is at its highest when the gripper arms is in an outer clamping position and the clamping pressure is at its lowest when the gripper arms is in an inner clamping position.

7. A mobile lift system comprising:

a base;

a lift unit arranged at the base, where the drive unit is configured to lift or lower a clamp device in a lift direction;

a drive unit connected to the lift unit, where the drive unit is configured to run the lift unit, eventually with the help of an internal energy source;

a control unit connected to the lift unit, where the control unit is configured to control at least the lift unit; and wherein the clamp device is configured according to claim 1.

8. The mobile lift system according to claim 7, wherein a rotation unit is arranged between the clamp device and the lift unit, where the rotation unit is configured to rotate the clamp device in a rotational direction around an axis of rotation.

9. The mobile lift system according to claim 7, wherein at least one sensor is arranged on the lift system and configured to at least measure the clamping pressure either directly or indirectly, where the at least one sensor is connected to the control unit.

10. The clamp device according to claim 1, wherein the one end of the gripper arm is rotatable connected to the supporting part.

11. The clamp device according to claim 1, wherein the actuating system is configured to rotate the at least one gripper arm around an axis of rotation on the supporting part via the at least one actuator.

* * * * *